April 6, 1943.    B. F. JAY    2,315,793
MUSICAL EDUCATIONAL DEVICE
Filed May 23, 1942

INVENTOR.
BENJAMIN F. JAY
BY

UNITED STATES PATENT OFFICE 2,315,793

MUSICAL EDUCATIONAL DEVICE

Benjamin F. Jay, New York, N. Y.

Application May 23, 1942, Serial No. 444,187

13 Claims. (Cl. 84—476)

The present invention is directed to a musical device for educational purposes, and more particularly, one which is adapted to interest and teach a child to play tunes and to read music.

The invention consists essentially in the provision of a series of blocks quite similar to the ordinary blocks containing letters which are commonly used as toys. The blocks used in the present invention are seven in number and represent the seven notes of the musical octave. Each of the blocks is hollow and is provided with a suitable musical device the note of which is one of the notes of the octave.

In addition, the invention contemplates that each of the blocks be identified not only with a letter from A to G inclusive, representing the notes of the octave, but each of the blocks is further identified by the picture of, for example, an animal. Thus, on block A there will be the picture of an alligator, on block B the picture of a bear, on block C the picture of a cat, and so on through all of the blocks. The child readily recognizes the animal on the block and is able to associate the letter with the animal.

In order to teach the child to correlate the tones with the musical scale, the invention further contemplates the provision of sheet music in which each of the notes is not only identified by the letter thereof, but also by the picture of the animal. Thereby, when the child reads the notes on the music sheet, the symbol is associated in the child's mind with the block having similar markings and he can be readily taught to strike the notes on the corresponding blocks in the order in which the symbols appear on the sheet music. Thereby, he quickly learns not only to read music by means of the pictures, but also by the letters associated with the notes and the positions thereof on the sheet music.

In the accompanying drawing constituting a part hereof and in which like reference characters indicate like parts:

Figure 1:
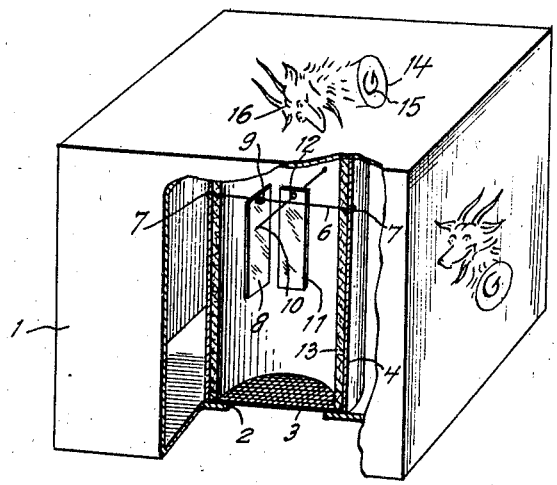
Fig. 1 is a perspective view of a block made in accordance with the present invention, some parts being broken away for clearness.
Figure 2:
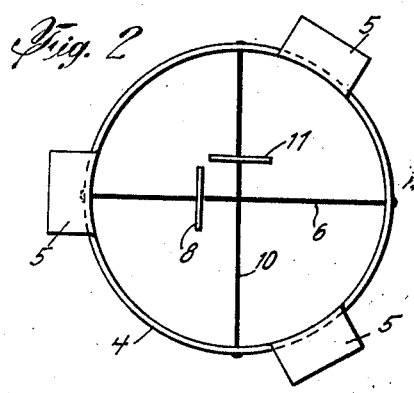
Fig. 2 is a top plan view of the cylindrical member carrying the musical note within the block.

There is provided a hollow block 1 made of any suitable material such as cardboard, wood, plastic, metal, or the like. The bottom thereof is provided with an opening 2 covered by gauze 3 whereby sound waves from the interior of the block may emanate without distortion. A cylindrical member 4, usually of cardboard, has flaps 5 at the upper end thereof cemented to the underside of the top of the block to hold the cylinder in place. A thread 6 across the upper portion of cylinder 4 is held by the knotted ends 7. A metal piece 8 having an opening 9 is threaded thereon and constitutes the basis of the music. A similar thread 10 carries metal piece 11 which is threaded onto the same by opening 12. The metal pieces 8 and 11 have the same musical note. A lining 13 for cylinder 4 is made of sound-proofing material and acts to absorb vibrations so as to prevent cross tones.

The upper faces of the blocks are provided with circles 14 printed thereon, each containing a letter 15 corresponding to the letters of the musical notes. The picture of an animal 16 is associated therewith and made part of circle 14.

Figure 3:
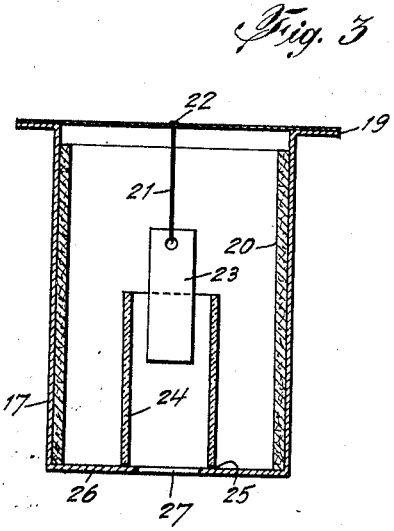
Fig. 3 is a vertical cross-sectional view of a modified form of cylindrical member used for the same purpose.

In the modification shown in Fig. 3 the cylindrical member 17, similar to cylinder 4, has an upper surface 18 with overhanging portions 19 adapted to be cemented to the inside of the block. Insulating material 20 lines the inner walls of cylinder 17. A thread 21 held in top 18 at 22 suspends metal plate 23 which constitutes the musical note. A glass cylinder 24 secured at 25 in the bottom 26 of cylinder 17 is provided, so that the metal plate 23 may sound its note by contact therewith. An opening 27 is adapted to be aligned with opening 2 of block 1.

Figure 4:
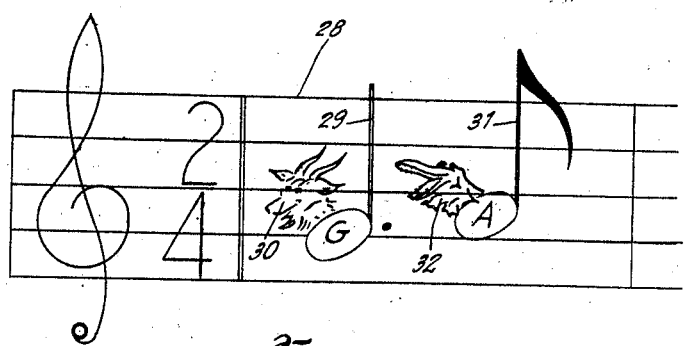
Fig. 4 is a fragmentary view of sheet music so formed as to correspond with the illustrations on the blocks.

In Fig. 4 is shown the musical bar 28 with a note 29 thereon carrying the picture 30 of an animal, said picture corresponding to the note of the scale. Another note 31 carries a picture 32 of the animal corresponding with said note. The entire sheet of music is formed in a similar manner in order to provide a tune or song.

It will be apparent that the child will, upon reading the notes in sequence, be able to identify the proper blocks corresponding thereto. He will first be taught to shake a corresponding block in the proper sequence and thus obtain a tune. He can then be readily taught to distinguish between the length of notes and thus obtain the correct rhythm. It is a simple matter, thereafter, to teach him the position of each of the notes and the letter identifying the same.

Also, I have described my invention setting forth several embodiments thereof. It will be apparent to those skilled in the art that various modifications in the details may be made within the scope of the invention. For instance, instead of a cylindrical glass tube 24, one may substitute a glass cup or the material thereof may be of a different character, but one which is sufficiently resonant for the purpose. The blocks may be made of solid wood with cylindrical openings bored therein, and the cylinders may be fitted into the same by friction alone. Various other details of construction may be changed within the spirit of the invention, the scope of which is defined by the claims appended hereto.

What I claim is:

1. A musical educational device comprising a series of hollow substantially cubical blocks, indicia on at least one of the faces of each block including a letter from A to G inclusive and the picture of an animal the name of which has the corresponding initial letter, a musical note within each block corresponding to said letter, and a sheet of music the notes of which have said animal pictures associated therewith, whereby a child may learn to play tunes by picture reading.

2. A musical educational device comprising a series of hollow substantially cubical blocks, indicia on at least one of the faces of each block including the picture of an animal the name of which has the corresponding initial letter from A to G inclusive, a musical note within each block corresponding to said letter, and a sheet of music the notes of which have said animal pictures associated therewith, whereby a child may learn to play tunes by picture reading.

3. A musical educational device comprising a series of hollow substantially cubical blocks, indicia on at least one of the faces of each block including a letter from A to G inclusive and the picture of an animal the name of which has the corresponding initial letter, a musical note within each block corresponding to said letter, said note being a freely suspended metal plate, a vibration producing member in proximity to said plate adapted to contact therewith to strike a tone, and a sheet of music the notes of which have said animal pictures associated therewith, whereby a child may learn to play tunes by picture reading.

4. A musical educational device comprising a series of hollow substantially cubical blocks, indicia on at least one of the faces of each block including a letter from A to G inclusive and the picture of an animal the name of which has the corresponding initial letter, a musical note within each block corresponding to said letter, said note being a freely suspended metal plate, a vibration producing member in proximity to said plate adapted to contact therewith to strike a tone, an opening in said block to allow free egress of musical tones therefrom, and a sheet of music the notes of which have said animal pictures associated therewith, whereby a child may learn to play tunes by picture reading.

5. A musical educational device comprising a series of hollow substantially cubical blocks, indicia on at least one of the faces of each block including a letter from A to G inclusive and the picture of an animal the name of which has the corresponding initial letter, a musical note within each block corresponding to said letter, said note being a freely suspended metal plate, a vibration producing member in proximity to said plate adapted to contact therewith to strike a tone, said member being a cylindrical glass, and a sheet of music the notes of which have said animal pictures associated therewith, whereby a child may learn to play tunes by picture reading.

6. A musical educational device comprising a series of hollow substantially cubical blocks, indicia on at least one of the faces of each block including a letter from A to G inclusive and the picture of an animal the name of which has the corresponding initial letter, a musical note within each block corresponding to said letter, said note being a freely suspended metal plate, a vibration producing member in proximity to said plate adapted to contact therewith to strike a tone, said member being a freely suspended metal plate, and a sheet of music the notes of which have said animal pictures associated therewith, whereby a child may learn to play tunes by picture reading.

7. A musical educational device comprising a series of hollow substantially cubical blocks, indicia on at least one of the faces of each block including a letter from A to G inclusive and the picture of an animal the name of which has the corresponding initial letter, a musical note within each block corresponding to said letter, said note being a freely suspended metal plate, a vibration producing member in proximity to said plate adapted to contact therewith to strike a tone, a substantially cylindrical sound chamber for said plate and member, sound absorbing material lining said chamber, and a sheet of music the notes of which have said animal pictures associated therewith, whereby a child may learn to play tunes by picture reading.

8. A musical educational device comprising a series of hollow substantially cubical blocks, indicia on at least one of the faces of each block including a letter from A to G inclusive and the picture of an animal the name of which has the corresponding initial letter, a musical note within each block corresponding to said letter, a substantially cylindrical sound chamber in said block, two threads crossing at substantially right angles stretched across the top of said chamber, a metal plate freely suspended on each of said threads, and a sheet of music the notes of which have said animal pictures associated therewith, whereby a child may learn to play tunes by picture reading.

9. A musical educational device comprising a series of hollow substantially cubical blocks, indicia on at least one of the faces of each block including a letter from A to G inclusive and the picture of an animal the name of which has the corresponding initial letter, a musical note within each block corresponding to said letter, a substantially cylindrical sound chamber in said block, a thread suspended from the top of said chamber and carrying a metal plate, a glass member secured in the bottom thereof, and a sheet of music the notes of which have said animal pictures associated therewith, whereby a child may learn to play tunes by picture reading.

10. In a musical educational device, a cubical block, indicia on at least one of the faces of said block including a letter from A to G inclusive and the picture of an animal the name of which has the corresponding initial letter, a musical note within said block corresponding to said letter, said note being a freely suspended plate, a stationary vibration producing member against which said plate is adapted to strike to sound a note, and an opening in said block to allow free egress of musical tones therefrom.

11. In a musical educational device, a cubical block, indicia on at least one of the faces of said block including a letter from A to G inclusive and the picture of an animal the name of which has the corresponding initial letter, a musical note within said block corresponding to said letter, said note being a freely suspended plate, a stationary vibration producing member against which said plate is adapted to strike to sound a note, said member being a cylindrical glass, and an opening in said block to allow free egress of musical tones therefrom.

12. In a musical educational device, a cubical block, indicia on at least one of the faces of said block including a letter from A to G inclusive and the picture of an animal the name of which has the corresponding initial letter, a musical note within said block corresponding to said letter, said note being a freely suspended plate, a stationary vibration producing member against which said plate is adapted to strike to sound a note, a substantially cylindrical sound chamber for said plate and member, sound absorbing material lining said chamber, and an opening in said block to allow free egress of musical tones therefrom.

13. In a musical educational device, a cubical block, indicia on at least one of the faces of said block including a letter from A to G inclusive and the picture of an animal the name of which has the corresponding initial letter, a musical note within said block corresponding to said letter, a substantially cylindrical sound chamber in said block, a pair of crossed threads stretched across the top of said chamber, a plate being freely suspended by each of said threads and adapted to strike against each other to sound a note, and an opening in said blocks to allow free egress of musical tones therefrom.

BENJAMIN F. JAY.